(No Model.) 3 Sheets—Sheet 1.

T. HOULAHAN.
CAN FILLING AND PACKING MACHINE.

No. 424,885. Patented Apr. 1, 1890.

Witnesses:
G. A. Hinchman Jr.
Charles Pickles,

Inventor:
Thos Houlahan
By Fowler & Fowler
Attorneys

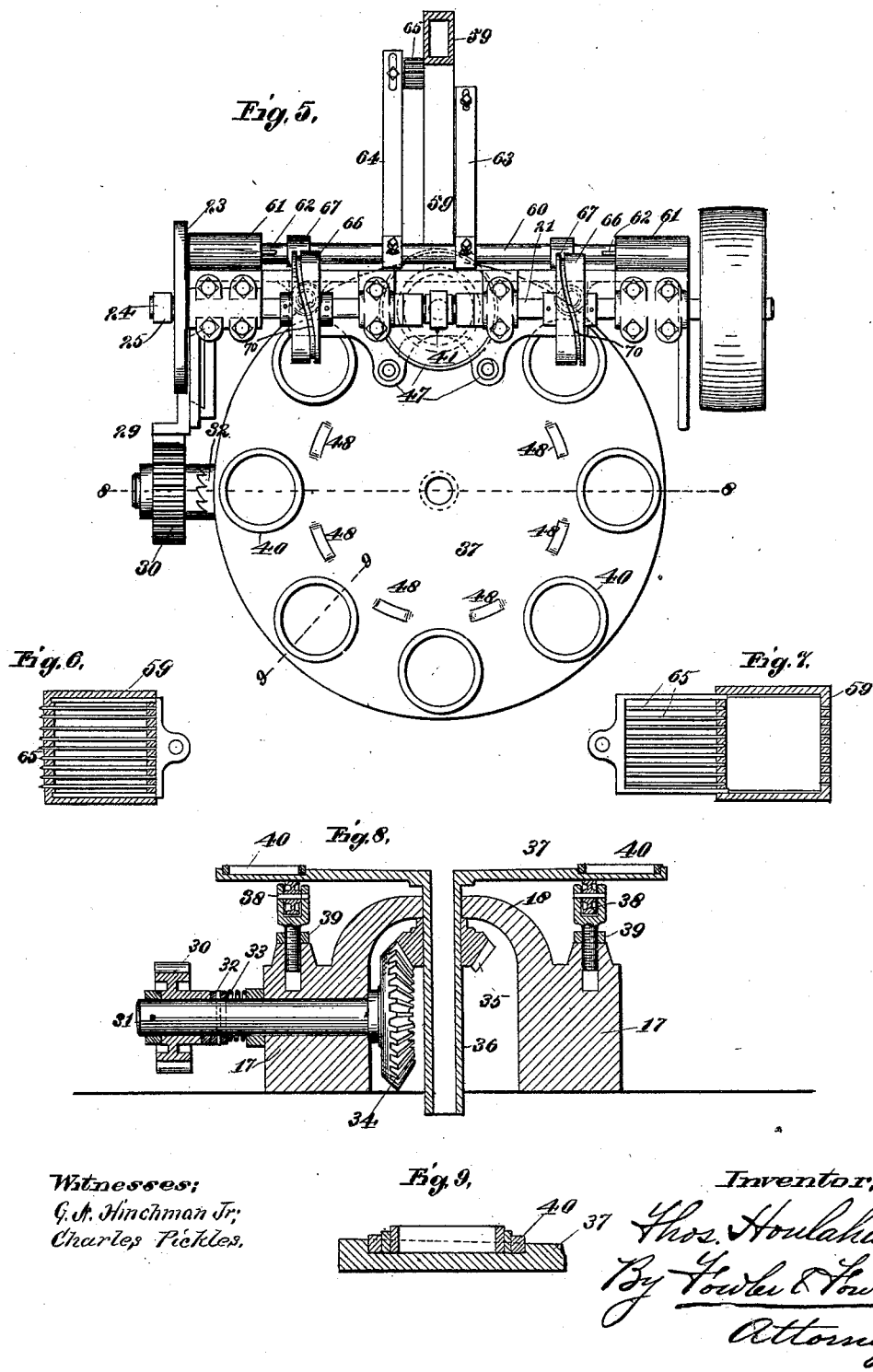

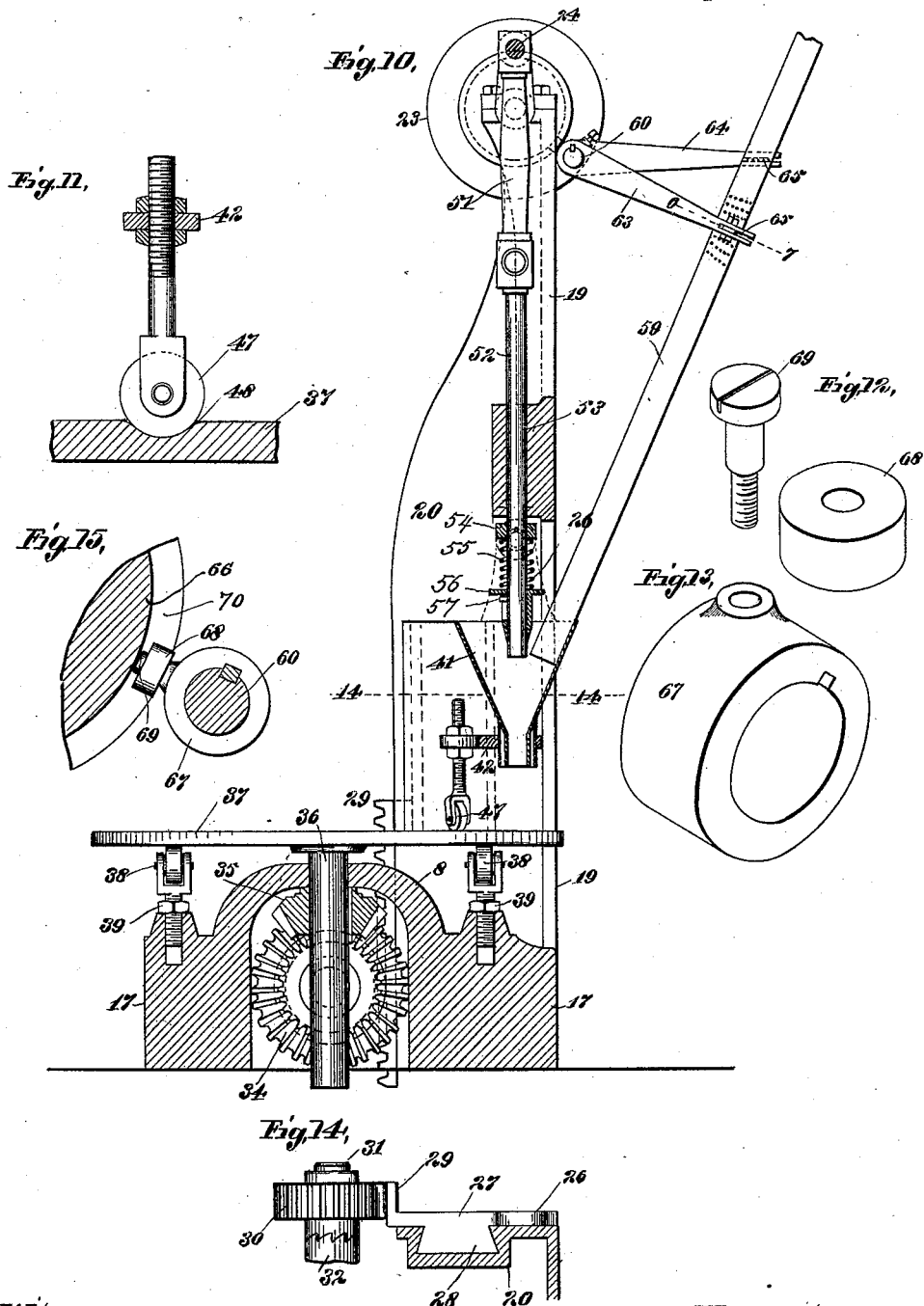

UNITED STATES PATENT OFFICE.

THOMAS HOULAHAN, OF ST. LOUIS, MISSOURI.

CAN FILLING AND PACKING MACHINE.

SPECIFICATION forming part of Letters Patent No. 424,885, dated April 1, 1890.

Application filed May 4, 1889. Serial No. 309,606. (No model.)

*To all whom it may concern:*

Be it known that I, THOMAS HOULAHAN, a citizen of the United States, residing at St. Louis, in the State of Missouri, have invented certain new and useful Improvements in Can Filling and Packing Machines, of which the following is such a full, clear, and exact description as will enable any one skilled in the art to which it appertains to make and use the same, reference being had to the accompanying drawings, forming part of this specification.

My invention relates to improvements upon a machine for filling cans patented to me on the 17th day of June, 1879, No. 216,569.

The object of the present invention is to produce a can filling and packing machine that is automatic in all of its operations.

I have shown in the accompanying drawings an apparatus embodying my invention, in which—

Figure 1:
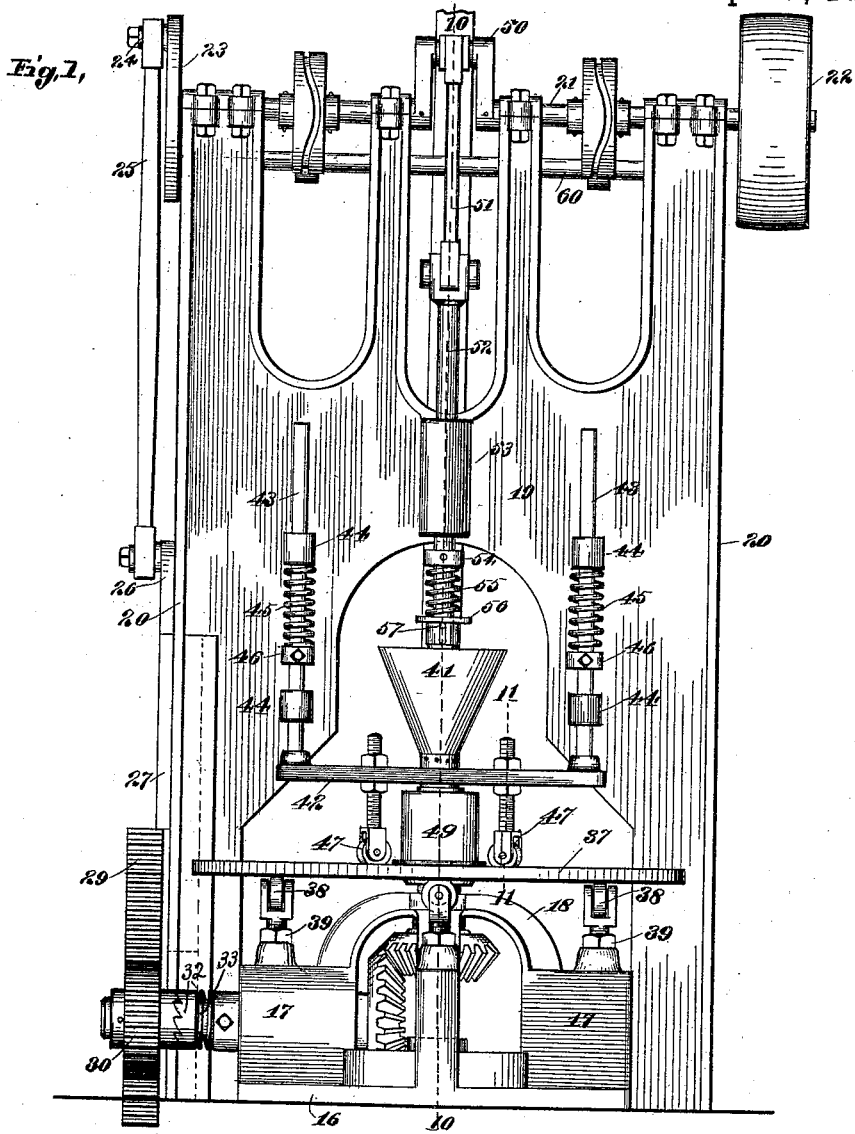
Figure 2:
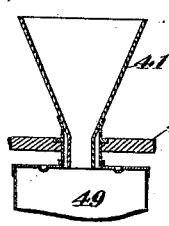
Figure 3:
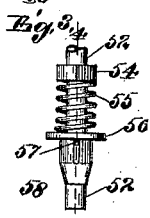

Figure 1 is a front elevation thereof. Fig. 2 is a section through the hopper and a portion of a can. Fig. 3 is a detail view showing the end of the piston or plunger, and Fig. 4 a section of the latter on the line 4 4 of Fig. 3. Fig. 5 is a plan of my canning-machine. Figs. 6 and 7 are cross-sections on the lines 6 7 of Fig. 10, showing the chute and valve for controlling the supply of material, the said valve being illustrated in closed and open positions, respectively, in said figures. Fig. 8 is a vertical section on the line 8 8 of Fig. 5. Fig. 9 is a vertical section on the line 9 9 of Fig. 5. Fig. 10 is a vertical section of the apparatus on the line 10 10 of Fig. 1. Fig. 11 is a vertical section on the line 11 11 of Fig. 1. Figs. 12 and 13 are perspective views of details, and Fig. 14 is a horizontal sectional plan view of a detail on the line 14 14 of Fig. 10. Fig. 15 is a view of a detail.

The same figures of reference indicate the same parts throughout the several views.

16 is the bed-plate of the machine that supports four equidistant pedestals 17, which, together with arched pieces 18, bridging the space between the opposite pedestals, constitute the bed-frame of the machine. At the rear of one of the pedestals 17 is an upright 19, that has sides 20 20 extending at right angles therefrom. The said upright 19 and the sides 20 constitute the upright part of the frame of the machine.

21 is the main shaft that is driven by a pulley 22, supplied by power from any suitable source. The main shaft 21 is supported by bearings at the upper part of the upright frame. It carries at the end remote from the pulley 22 a disk 23, upon which is mounted a crank-pin 24, to which is pivotally connected a pitman 25. The pitman 25 is in turn swiveled to an extension 26, which extends upward from a vertical sliding bar 27. The said bar 27 is provided with a dovetail part 28, which takes into a corresponding dovetail in one of the side pieces 20 of the frame of the machine, so as to serve as a guide for said bar. The vertically-sliding bar 27 is at its lower part bent to form a right-angled part 29, upon the face of which a rack is cut. This rack gears into a small spur-wheel 30, which is loosely mounted upon a shaft 31, journaled in one of the pedestals 17. The sleeve by which the spur-wheel 30 is swung about the shaft 31 is provided with ratchet-teeth, which engage a clutch 32, that is pressed by means of a spring 33 into engagement with said teeth. The clutch 32 is fastened to the shaft 31, so as to rotate therewith, but may slide on said shaft. When the spur-wheel 30 is rotated in one direction by the rack 29, the shaft 31 will be turned thereby; but when rotated in the other direction the teeth upon the sleeve of the spur-wheel will escape the teeth of the clutch 32, and the rotation of the spur-wheel will not carry the clutch with it, and consequently will not rotate said shaft 31.

The inner end of the shaft 31 is provided with a bevel-wheel 34, that meshes in a second bevel-wheel 35, which is keyed to a vertical shaft 36. The shaft 36 is connected to the bevel-wheel 35, so that said shaft may slide through said bevel-wheel, but will be rotated by said bevel-wheel. The said vertical shaft 36 carries a rotatable table 37, upon which the cans are arranged. Each of the pedestals 17 support anti-friction rollers 38, which bear on the under side of said table 37 and sustain the same. The bearings in which said anti-friction rollers are mounted are made so as to be adjustable by means of screws and nuts 39. When these nuts are screwed up or down, the table may be raised or lowered by the nuts to suit different heights of cans. The said table 37 may be provided at any number of places with rings 40, by which the cans are held in place. In Fig. 9 I have shown several concentric rings of different heights arranged in a depression in said table, whereby by inserting or removing a greater or less number of said rings cans of greater or less diameter can be held in place. The adjustment for the height of the can is made by raising or lowering the table 37, as pointed out before.

The hopper for supplying material to the cans is designated by the numeral 41, and is carried by a cross-bar 42, which is guided by vertical rods 43 43, sliding through bearings 44, mounted upon the upright 19 of the frame of the machine. Said vertical rods 43 are encircled by spiral springs 45, which bear against the bearings 44 and collars 46, rigidly attached to said rods. The said springs 45 always tend to keep the cross-bar 42 and hopper in their depressed position. The weight of said hopper 41 and cross-bar 42 may be sustained by anti-friction rollers 47 47 at each side of the center of the machine, which bear upon the table 37. Said table has a number of depressions 48 therein corresponding to the number of cans to be carried by the same, which depressions are adapted to come beneath the anti-friction rollers 47. The normal position of parts is that shown in the drawings, in which the hopper is at its lowest point and the neck of the same is introduced into the mouth of a can 49, Fig. 2. The rotary table 37 is held at rest for awhile, and said parts maintain their normal position until the can is filled. When the table 37 begins to rotate, the depressions 48 leave the anti-friction rollers 47. Consequently the cross-bar 42 and the hopper 41 are raised, and the neck of the hopper is therefore freed from the can, so that said can may pass from beneath the hopper, whereupon it can be removed by hand from the table. As the table continues to rotate, another can will be brought in position beneath the hopper, and just as soon as this second can is positioned the anti-friction rollers 47 will encounter the depressions 48, and the cross-bar 42 and the hopper will be lowered, and the neck of the hopper introduced into the mouth of the can. It will be noted that by means of the clutch mechanism set forth when the pitman 25 and the rack 29 are descending, the table 37 will not be rotated; but said table will only be rotated upon the rising of the pitman 25 and rack 29.

At the center of the main shaft 21 is a double crank 50, that carries a second pitman 51, which is preferably set at the same angle as the pitman 25. This pitman 51 is swiveled to a plunger 52, which plays through a guide-piece 53, attached to the upright 19 of the frame. Said plunger is adapted to play through the hopper and pack the material into the cans. The pitman 25 and the pitman 51 being set at the same angle cause the downstroke of the rack 29 to take place at the same time that the downstroke of the plunger 52 does. This we have seen is the time at which the table does not rotate, it being the period at which the can is held beneath the hopper and the material is packed by the downstroke of the plunger into the cans. At the downstroke of the plunger, therefore, the cans are held stationary and are filled, and when the plunger performs its upstroke the filled can is removed from beneath the hopper and a new one rotated into position beneath said hopper to be filled upon the return-stroke of said plunger.

Figure 4:
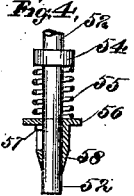

The end of the plunger is made to telescope, which is best illustrated by Figs. 3 and 4. At some distance from the lower end of the plunger I secure a collar 54 rigidly to the same, to which I attach one end of a spiral-spring 55, that encircles the lower portion of said plunger. Said spiral spring 55 carries at its lower end a sliding sleeve 56, the play of the same being limited by a pin 57 that projects from the plunger and works in a slot cut in said sliding sleeve. The upper part of the sliding sleeve 56 is flanged and the central part made of substantially straight sides nearly parallel with the sides of the plunger, while the lower end 58 thereof is inclined. When the plunger moves downward, the material is driven by it and the sleeve 56 through the hopper into the can. At the latter part of the downstroke the incline 58 of the sleeve 56 comes against the incline sides of the hopper and a movement of the plunger independent of the sleeve now takes place. This latter movement of the plunger forces the material that is left in the neck of the hopper into the can, thus effectually packing all the material into the cans each time. As soon as the plunger rises the parts resume their normal positions through the instrumentality of the spring 55.

An air-pump may be employed to exhaust the air from the cans when in position to be filled, in order to make the cans pack easier. I make no claim to this, as I am aware that it is not new with me.

In order to supply material to the hopper, I provide a chute 59, into which the material is placed. This chute is shown as broken away at the top in Fig. 10 for the purpose of saving space. The hopper supported above the chute, and which supplies material thereto, is not illustrated in the drawings, as it makes no part of my invention. I design to have a certain amount of material supplied to each can, and to regulate this I place across the chute cut-off valves, so that the same weight or quantity will be delivered each time to the cans automatically—that is, by the operation of the machine itself.

60 is a counter-shaft swung by bearings 61 from near the top part of the upright frame of the machine. Said shaft may be provided with splines 62, which mesh with the bearings 61, so as to prevent said shaft from rotating, but render it capable of a back-and-forth movement. From said shaft 60 extend two arms 63 and 64, each of which carries at its outer end a sliding gate or valve 65, said gate being adapted to open and close the passage-way through the chute 59. The arms 63 and 64 are set at different angles, so that there will be considerable distance between said valves, which will determine the amount of material that is delivered to the hopper and packed in the cans. Only that amount of material which is between the two valves is delivered each time to the hopper. The arm 63 is adjustably secured to the shaft 60, so that the lower valve 65 may be raised or depressed to throw the valves a greater or less distance apart, so as to deliver a greater or less amount to the hopper.

In Fig. 10 I have shown the chute 59 as provided with several openings, whereby the lower valve 65 can be adjusted to play through any of said openings and made to regulate the quantity of material delivered to the hopper. The shaft 60, carrying the arms 63 and 64, is controlled by two wabble-cams 66 66, arranged upon the main shaft 21. The shaft 60 carries collars 67, to which collars are secured anti-friction rollers 68 by means of screws 69. The anti-friction rollers 68 travel through the grooves 70 in said cams as they rotate.

The object of using two wabble-cams is merely to distribute the strain along the main shaft. In other respects one wabble-cam would answer to give the motion as well. The arms 63 and 64 are moved at the same time in the same direction by means of the wabble-cams and shaft 60. As the lower valve 65 opens the chute, the upper one closes it, and the material in the space in the chute between the two valves gravitates into the hopper. In the position of parts shown in the drawings the lower valve has closed the chute, and no material is being delivered to the hopper. The plunger is also in its uppermost position. As soon, however, as the plunger begins to descend the lower valve 65 is opened and the upper valve 65 closed, the material between the two being delivered to the hopper. The opening and closing of these valves takes place during one-quarter of a revolution, as will be seen by reference to the cam-grooves 70, (more particularly in Fig. 5,) so that when the plunger is at the last part of its stroke the supply of material is completely cut off from the hopper. The valves may be timed to operate in any other way and through other means than that shown without departing from the invention. They may be made to completely close the chute if necessary—that is, be made in one solid piece instead of being made with cross-bars and leaving spaces between said bars, as shown in the drawings.

By means of the above-described machine the amount of material delivered to the cans is regulated, the hopper raised and lowered as each can is positioned beneath the same, the cans filled, and the table carrying the cans positioned beneath the hopper and held beneath the same until filled by the operation of the machine itself, making the entire operation continuous and automatic.

What I desire to claim, and secure by Letters Patent of the United States as my invention, is—

1. The combination, in a can filling and packing machine, of a vertically-movable hopper, a revolving can-carrying table, and connections between said vertically-movable hopper and revolving can-carrying table, whereby the movement of the table will automatically raise and lower said hopper, for the purpose described.

2. The combination, in a can filling and packing machine, of a vertically-moving hopper, a movable can-carrying table, connections between said movable hopper and can-carrying table, whereby the movement of the table will automatically raise and lower said hopper, and a telescoping plunger, substantially as and for the purpose described.

3. The combination, in a can filling and packing machine, of a movable table governed by the operation of the machine, a vertically-movable hopper controlled by said movable table, a chute supplying material to said hopper, a plunger playing in said hopper, and valves in said chute controlled by the machine, governing the supply of material to said hopper.

4. The combination, in a can filling and packing machine, of a rotating can-carrying table, a vertically-movable hopper for introducing the material into the cans, connections between said table and hopper, whereby said can-carrying table raises and lowers said hopper to introduce and withdraw the neck of the same from the cans, gearing intermittingly revolving said rotating table to position the cans, a chute for delivering material to the aforesaid hopper, valves in said chute for regulating the quantity of material delivered to said hopper, connections automatically controlling said valves, and a plunger in said hopper operated by the aforesaid gearing, for the purpose described.

5. The combination, in a can filling and packing machine, of a rotary can-carrying table 37, bevel-gears 34 and 35, for rotating the same, the latter sliding upon the shaft 36, connected with said table, and adjusting devices for raising and lowering said table to suit cans of different heights.

In testimony whereof I have hereunto set my hand and affixed my seal, this 1st day of May, 1889, in the presence of the two subscribing witnesses.

THOMAS HOULAHAN. [L. S.]

Witnesses:
A. C. FOWLE,
M. S. REEDER.